Feb. 5, 1924.
H. H. HUNTINGTON ET AL
SPROCKET WHEEL
Original Filed Aug. 20, 1919
1,482,896
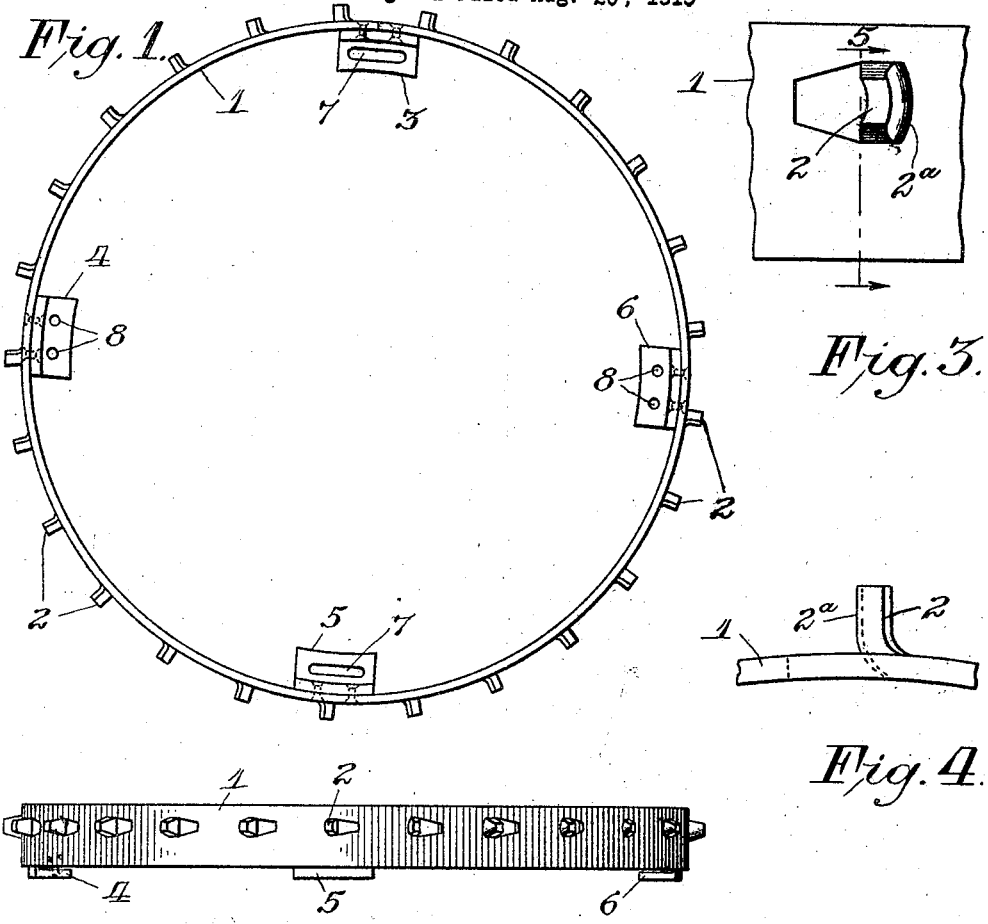
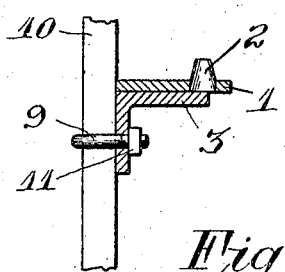
Inventors.
Hiram H. Huntington
and Edward H. Cureton,
By
Atty Patented Feb. 5, 1924.

1,482,896

UNITED STATES PATENT OFFICE.

HIRAM H. HUNTINGTON AND EDWARD H. CURETON, OF RICHMOND, INDIANA.

SPROCKET WHEEL.

Original application filed August 20, 1919, Serial No. 318,630. Divided and this application filed April 17, 1922. Serial No. 554,307.

*To all whom it may concern:*

Be it known that we, HIRAM H. HUNTINGTON and EDWARD H. CURETON, citizens of the United States, and residents, respectively, of Richmond, in the county of Wayne and State of Indiana, and of Richmond, in the county of Wayne and State of Indiana, have invented certain new and useful Improvements in Sprocket Wheels, of which the following is a full, clear, and exact specification.

This invention relates to improvements in sprocket wheels and more particularly to one formed from a metallic band which has the sprocket teeth struck up or punched therefrom and is afterward rolled into the form of a circle or hoop to form the wheel, and this application is a division of our copending application, Serial No. 318,630 filed August 20, 1919.

The principal object of the invention is to provide a form of tooth which may be readily struck up from the metallic band and to extend radially therefrom and shaped to provide for effective engagement with the links of a sprocket chain and be of sufficient strength to withstand working strain.

A further object of the invention is to provide novel and improved means for connecting the ends of the metallic band and also for securing the band to a support or driving part such as the spokes of a wagon wheel.

In the accompanying drawings:—

Fig. 1 is a side elevation of a construction embodying the improvements.

Fig. 2 is a plan view of same.

Fig. 3 is an enlarged plan view of a portion of a sprocket tooth.

Fig. 4 is an enlarged side view of a portion of same.

Fig. 5 is an enlarged section on the line 5—5 of Fig. 3.

Fig. 6 is a vertical section of a portion of the rim and one of the supporting brackets shown attached to a wagon wheel spoke.

The toothed rim embodying the improvements is one especially intended to be attached to the wheel of a farm wagon for the purpose of transmitting motion to the seeding devices of an end-gate seeder. Heretofore, it has been usual to employ cast iron sprocket wheels for the purpose, but the breakage of these cast iron wheels resulting principally from shipping has been a serious drawback, and in order to overcome this objection we have devised a wheel of the following construction.

Referring to the drawings, 1 represents a steel band having sufficient flexibility to enable it to be rolled in the form of a hoop. When in a flat condition, the band is punched to provided a series of radially extending teeth 2, equally spaced throughout the length of the band. The teeth are cut or punched from the band longitudinally of its length of a tapering form so that the top of each tooth will be narrower than its base, as indicated in Fig. 3, and the teeth are bent back at right angles so that they will extend in a radial direction when the band is rolled to a circular form. The width of the cut for each tooth is such that the width of the tooth will be considerably greater than its thickness, represented by the thickness of the band. The forward face of each tooth, or that face which engages the links of the sprocket chain, is of slightly convex form, as shown best in Figs. 3 and 5 and indicated by $2^a$, so as to present a rounded surface to the links of the chain and thereby reduce the wear between the parts.

As shown in Fig. 1 the ends of the band after being rolled into the form of a hoop are secured together by an angle iron bracket 3, one wing of which is riveted to the inner periphery of each end of the band. Additional brackets 4, 5 and 6 of similar form are likewise secured at equal distances about the inner periphery of the rim. The brackets 3 and 5 are provided with slotted openings 7, while the brackets 4 and 6 have round openings 8 and these brackets are designed to receive U-shaped clips 9 which are placed about the spokes 10 of the wheel to which the sprocket rim is attached for the purpose of securing the rim in position on the wheel; nuts 11 serving to securely clamp the brackets in position. The slotted openings 7 are longer than the width of the clips 9 so that the clips may be brought in registry with the spokes of the wagon wheel.

By the construction described, it will be seen that a very simple, strong and efficient sprocket wheel is formed which may be readily applied to the spokes of a wagon wheel, and in which all danger of breakage by shipping or ordinary use is eliminated; also one in which the teeth will be effective for their purpose, being so formed as to present wide, rounded faces to the chain and being of sufficient strength to resist all driving stresses as well as occupying the proper radial position.

While we have shown and described the rim formed from a flat band or bar, which is the preferable form, we do not wish to be confined to this particular shape, as good results may be obtained with bands or bars of angle, channel, oval, half-oval or other shapes.

We claim:

1. A sprocket wheel comprising a flexible band bent into circular form and provided with sprocket teeth struck out radially therefrom and a plurality of supporting brackets fixed to the inner side of the band at spaced points in its circumference, one of which has the united ends of the band fixed thereon.

2. A sprocket wheel comprising a flexible metallic band bent into circular form and provided with sprocket teeth struck out radially therefrom, and a plurality of supporting brackets fixed to the inner face of the band at spaced points in its circumference one of said brackets having the ends of the band, riveted thereon, said brackets comprising angularly bent plates having one wing fixed to the band and the other wing provided with openings for attaching it to a wagon wheel.

In testimony whereof we affix our signatures, in the presence of a witness.

HIRAM H. X HUNTINGTON.
his

EDWARD H. CURETON.
mark

Witness to signature of HIRAM H. HUNTINGTON:

OWEN L. LOOFBOURROW.

Certificate of Correction.

It is hereby certified that Letters Patent No. 1,482,896, granted February 5, 1924, upon the application of Hiram H. Huntington and Edward H. Cureton, of Richmond, Indiana, for an improvement in "Sprocket Wheels," were erroneously issued to the inventors, said Huntington and Cureton, whereas said Letters Patent should have been issued to *The American Seeding Machine Company, of Springfield, Ohio, a Corporation of Ohio,* as assignee of the entire interest in said invention, as shown by the record of assignments in this office; and that the said Letters Patent should be read with this correction therein that the same may conform to the record of the case in the Patent Office.

Signed and sealed this 18th day of March, A. D., 1924.

[SEAL.]

KARL FENNING,
*Acting Commissioner of Patents.*